(12) United States Patent
Wu

(10) Patent No.: US 10,965,852 B2
(45) Date of Patent: *Mar. 30, 2021

(54) IMAGE CAPTURING APPARATUS

(71) Applicant: Gingy Technology Inc., Hsinchu (TW)

(72) Inventor: Jen-Chieh Wu, Hsinchu (TW)

(73) Assignee: Gingy Technology Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/563,939

(22) Filed: Sep. 9, 2019

(65) Prior Publication Data

US 2020/0007727 A1     Jan. 2, 2020

Related U.S. Application Data

(63) Continuation-in-part of application No. 15/588,700, filed on May 8, 2017, now Pat. No. 10,455,129.

(60) Provisional application No. 62/413,974, filed on Oct. 27, 2016, provisional application No. 62/371,230, filed on Aug. 5, 2016.

(30) Foreign Application Priority Data

Mar. 17, 2017  (CN) .......................... 201720260844.9

(51) Int. Cl.
*H04N 5/225*  (2006.01)
*F21V 8/00*   (2006.01)
*G06K 9/00*   (2006.01)

(52) U.S. Cl.
CPC ......... *H04N 5/2254* (2013.01); *G02B 6/0055* (2013.01); *G02B 6/0088* (2013.01); *G06K 9/00046* (2013.01); *H04N 5/2253* (2013.01); *H04N 5/2256* (2013.01)

(58) Field of Classification Search
CPC .. H04N 5/2254; H04N 5/2256; H04N 5/2253; G06K 9/00; G06K 9/00046; G02B 6/0088; G02B 6/0055
See application file for complete search history.

(56) References Cited

U.S. PATENT DOCUMENTS 10,455,129 B2 * 10/2019 Yu ...................... G06K 9/00046

* cited by examiner

*Primary Examiner* — John Bedtelyon
(74) *Attorney, Agent, or Firm* — JCIPRNET

(57) ABSTRACT

An image capturing apparatus including a light guide device having a first surface and a second surface opposite to each other, a display device disposed above or under the light guide device, an image capturing device above or under the light guide device, a first optical adhesive, a second optical adhesive and a light source is provided. The first optical adhesive is disposed on the first surface of the light guide device. The second optical adhesive is disposed on the second surface of the light guide device. The image capturing device is disposed above or under the light guide device. The light source is adapted to emit a light beam.

25 Claims, 10 Drawing Sheets

IMAGE CAPTURING APPARATUS

CROSS-REFERENCE TO RELATED APPLICATION

This application is a continuation-in-part application of U.S. application Ser. No. 15/588,700, filed on May 8, 2017, now allowed. The prior U.S. application Ser. No. 15/588,700 claims the priority benefits of U.S. provisional application Ser. No. 62/371,230, filed on Aug. 5, 2016, U.S. provisional application Ser. No. 62/413,974, filed on Oct. 27, 2016, and China application serial no. 201720260844.9, filed on Mar. 17, 2017. The entirety of each of the above-mentioned patent applications is hereby incorporated by reference herein and made a part of this specification.

BACKGROUND OF THE INVENTION

Field of the Invention

The invention relates to a photoelectric apparatus, and particularly relates to an image capturing apparatus.

Description of Related Art

Types of biometric identification include face, sound, iris, retina, vein and fingerprint identification, etc. Since each person's fingerprints are unique, and the fingerprints are not liable to be changed along with ages or health conditions, fingerprint identification system has become a most popular biometric identification system. According to different sensing methods, the fingerprint identification system can be divided into optical, capacitive, ultrasonic wave and thermal sensing fingerprint identification systems.

An image capturing apparatus of the optical fingerprint identification system may implement fingerprint capturing based on a total reflection principle, and a working principle thereof is as follows. A fingerprint is composed of a plurality of irregular convex portions (i.e. ridge patterns) and concave portions (i.e. groove patterns). When a finger presses the fingerprint identification system, the convex portions of the fingerprint may contact a transparent device of the image capturing apparatus, and the convex portions of the fingerprint do not contact the transparent device of the image capturing apparatus. The convex portions of the fingerprint that contact the transparent device spoil a total reflection of a light beam in the transparent device, such that the image capturing apparatus obtains dark stripes corresponding to the convex portions of the fingerprint. Meanwhile, the concave portions of the fingerprint do not spoil the total reflection of the light beam in the transparent device, such that the image capturing apparatus obtains bright stripes corresponding to the concave portions of the fingerprint. In this way, the light beam corresponding to the convex portions and the concave portions of the fingerprint may form a stripe pattern with spaced bright and dark stripes on a light receiving surface of the image capturing apparatus, such that the image capturing apparatus obtains a fingerprint image. By calculating information corresponding to the fingerprint image by using an algorithm, user's identify can be identified. However, in the conventional technique, the image capturing apparatus of the optical fingerprint identification system requires to use a large amount of optical adhesives with a high material cost, which is of no avail for cost reduction.

SUMMARY OF THE INVENTION

The invention is directed to an image capturing apparatus, which has a low cost.

The invention is directed to a plurality of image capturing apparatuses, which have good image capturing quality.

The invention provides an image capturing apparatus located in an environment medium. The image capturing apparatus includes a light guide device, an image capturing device, a display device, a first optical adhesive, a second optical adhesive and a light source. The light guide device has a first surface and a second surface disposed opposite to each other. The image capturing device is disposed above or under the light guide device. The display device is disposed above or under the light guide device. The first optical adhesive is disposed on the first surface of the light guide device. The second optical adhesive is disposed on the second surface of the light guide device. The image capturing device is disposed above or under the light guide device. A material of the light guide device is different to a material of the first optical adhesive and/or a material of the second optical adhesive. The light source is adapted to emit a light beam. The light beam passed through the light guide device is totally reflected by an interface between the image capturing apparatus and the environment medium.

The invention provides an image capturing apparatus located in an environment medium. The image capturing apparatus includes a light guide device, an image capturing device, a display device, a light absorbing layer and a light source. The light guide device has a first surface and a second surface disposed opposite to each other and a sidewall connected between the first surface and the second surface. The image capturing device is disposed above or under the light guide device. The display device is disposed above or under the light guide device. The light absorbing layer covers the sidewall of the light guide device. The light source is adapted to emit a light beam. The light beam passed through the light guide device is totally reflected by an interface between the image capturing apparatus and the environment medium. The light source is located at a side of the light guide plate or a side of the display panel or other suitable position, and the invention is not limited to.

The invention provides an image capturing apparatus located in an environment medium. The image capturing apparatus includes a light guide device, a first reflecting device, a second reflecting device, an image capturing device, a display device, a first light absorbing device and a light source. The light guide device has a first surface and a second surface disposed opposite to each other. The first reflecting device is disposed above or under the light guide device. The second reflecting device is disposed on the second surface of the light guide device. The image capturing device is disposed above or under the second surface of the light guide device. The display device is disposed above or under the light guide device. The first light absorbing device is disposed on the second surface of the light guide device. The light source is adapted to emit a light beam. The light beam reflected by the first reflecting device and the second reflecting device is totally reflected by an interface between the image capturing apparatus and the environment medium.

According to the above description, in the image capturing apparatus of an embodiment of the invention, the light guide device with a low material cost can be inserted between the transparent device and the image capturing device to replace a part of the optical adhesives originally required to be filled between the transparent device and the image capturing device in a large amount. In this way, the usage amount of the optical adhesive with a high material cost can be decreased to decrease the cost of the image capturing apparatus.

In the image capturing apparatus of another embodiment of the invention, the sidewall of the light guide device is covered with the light absorbing layer, and the light absorbing layer is adapted to absorb a stray light beam incident to the sidewall, so as to improve the image capturing quality of the image capturing apparatus.

In the image capturing apparatus of still another embodiment of the invention, the light guide device has the first surface facing to the transparent device and the second surface opposite to the first surface. The first surface of the light guide device is configured with the first reflecting device. The second surface of the light guide device is configured with the second reflecting device. The second surface of the light guide device is configured with the first light absorbing device. The first light absorbing device is adapted to absorb the stray light beam transmitted to the second surface, so as to improve the image capturing quality of the image capturing apparatus.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention. Moreover, in any of the following embodiments, the same or similar devices are denoted by the same or similar referential numbers.

Figure 1:
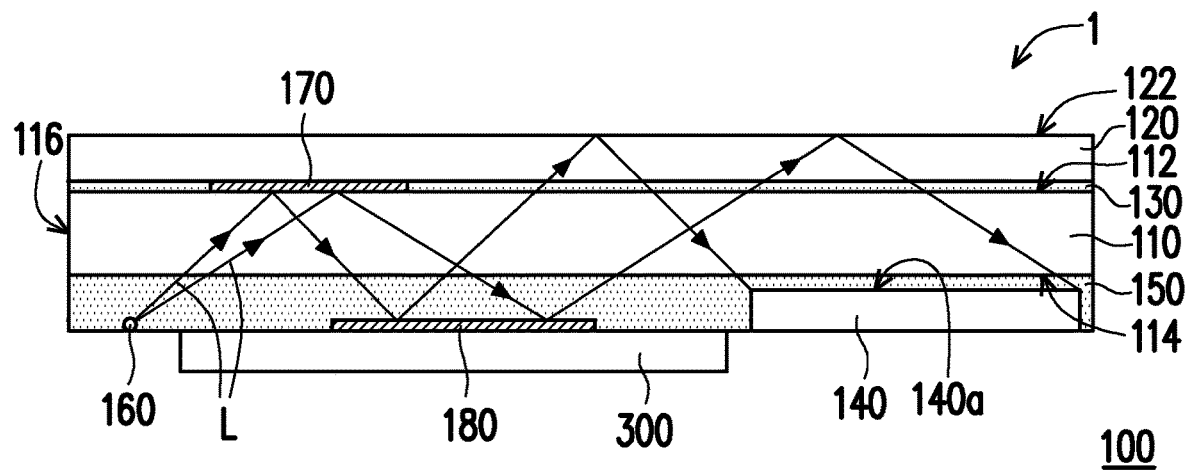
FIG. 1 is a cross-sectional view of an image capturing apparatus according to an embodiment of the invention.

FIG. 1 is a cross-sectional view of an image capturing apparatus according to an exemplary embodiment of the invention. Referring to FIG. 1, the image capturing apparatus 100 is located in an environment medium 1. In the present embodiment, the environment medium 1 is, for example, air, though the invention is not limited thereto, and in other embodiments, the image capturing apparatus 100 can also be located in other types of environment medium. The image capturing apparatus 100 is used for capturing an image of an object. Under a normal situation, the object has a biometric feature of, for example, a fingerprint, a palmprint, veins, etc., though the invention is not limited thereto.

The image capturing apparatus 100 includes a light guide device 110. The light guide device 110 has a first surface 112 and a second surface 114 disposed opposite to each other. The light guide device 110 further has a sidewall 116 connected between the first surface 112 and the second surface 114. In the present exemplary embodiment, the sidewall 116 is not tilted relative to the first surface 112. In other words, the sidewall 116 is approximately perpendicular to the first surface 112. Though the invention is not limited thereto, and in other embodiments, the sidewall 116 can also be tilted relative to the first surface 112. In the present embodiment, a refractive index of the light guide device 110 can be greater than or equal to 1.4 and smaller than or equal to 1.6. A material of the light guide device 110 is, for example, glass, though the invention is not limited thereto, and in other embodiments, the material of the light guide device 110 can also be other proper materials, for example, polymethylmethacrylate (PMMA), polycarbonate (PC) or other suitable transparent materials. In the present embodiment, the light guide device 110 may be a cover glass.

The image capturing apparatus 100 includes a transparent device 120. In the present embodiment, the transparent device 120 may be a protection film. The transparent device 120 is disposed on the first surface 112 of the light guide device 110. The transparent device 120 has a surface 122 back-facing to the light guide device 110. In the present embodiment, if the image capturing apparatus 100 is used for capturing a fingerprint and/or a finger vein, the surface 122 of the transparent device 120 faces to a finger. A material of the transparent device 120 can be glass, PMMA, PC or other suitable transparent materials.

The image capturing apparatus 100 includes a first optical adhesive 130. The first optical adhesive 130 is disposed between the transparent device 120 and the first surface 112 of the light guide device 110. The transparent device 120 is connected to the first surface 112 of the light guide device 110 through the first optical adhesive 130. In the present embodiment, the first optical adhesive 130 may have a refractive index the same or similar with that of the light guide device 110 and/or the transparent device 120, so as to reduce a loss of a light beam L at a boundary of the first optical adhesive 130 and the light guide device 110 and/or a boundary of the first optical adhesive 130 and the transparent device 120. In other words, the refractive index of the first optical adhesive 130 can also be greater than or equal to 1.4 and smaller than or equal to 1.6, though the invention is not limited thereto.

The image capturing apparatus 100 includes an image capturing device 140. The image capturing device 140 is disposed on the second surface 114 of the light guide device 110. The light guide device 110 is located between the transparent device 120 and the image capturing device 140. The image capturing device 140 has a light receiving surface 140a. In the present embodiment, the image capturing device 140 may be transparent and be disposed on a display device 300, but the invention is not limited thereto.

The image capturing apparatus 100 includes a display device 300. The display device 300 is disposed on the second surface 114 of the light guide device 110. In other words, the display device 300 is disposed under the light guide device 110. In the present embodiment, the display device 300 may cover the light guide device 110 partially, though the invention is not limited thereto. In other embodiments, the display device 300 may cover the light guide device 110 completely. In the present embodiment, the display device 300 may be a liquid crystal display (LCD), an OLED display or other type of a display. Moreover, in the present embodiment, the display device 300 may have a touch sensing layer, and the display device 300 may be a touch display device.

The image capturing apparatus 100 includes a second optical adhesive 150. The second optical adhesive 150 is disposed on the second surface 114 of the light guide device 110. The image capturing device 140 is connected to the second surface 114 of the light guide device 110 through the second optical adhesive 150. In the present embodiment, the second optical adhesive 150 may have a refractive index the same or similar with that of the light guide device 110, so as to reduce a loss of the light beam L at a boundary of the second optical adhesive 150 and the light guide device 110. In other words, the refractive index of the second optical adhesive 150 can also be greater than or equal to 1.4 and smaller than or equal to 1.6, though the invention is not limited thereto.

A material of the light guide device 110 is different to a material of the first optical adhesive 130 and a material of the second optical adhesive 150. In other words, the light guide device 110 with a lower material cost can be inserted between the transparent device 120 and the image capturing device 140 to reduce a usage amount of the optical adhesives filled between the transparent device 120 and the image capturing device 140. Since the usage amount of the first optical adhesive 130 and the second optical adhesive 150 with a high material cost is reduced, manufacturing cost of the image capturing apparatus 100 is reduced.

The image capturing apparatus 100 includes a light source 160. The light source 160 is adapted to emit the light beam L. The light beam L passed through the light guide device 110 is transmitted toward the transparent device 120, and is totally reflected by an interface (for example, the surface 122) between the image capturing apparatus 100 and the environment medium 1. When an object (for example, fingerprint convex portions) contacts the surface 122, the total reflection of the light beam L is spoiled on a part of the surface 122 corresponding to the fingerprint convex portions, such that the image capturing device 140 obtains dark stripes corresponding to the fingerprint convex portions. While the fingerprint convex portions touch a part of the surface 122, fingerprint concave portions do not contact the surface 122, and the total reflection of the light beam L is not spoiled on another part of the surface 122 corresponding to the fingerprint concave portions, such that the image capturing device 140 obtains bright stripes corresponding to the fingerprint concave portions. In this way, the image capturing device 140 may obtain an object image (for example, a fingerprint image) with spaced bright and dark stripes. In the present embodiment, the light beam L is an invisible light. For example, the light beam L may be an infrared ray (IR) or a near-infrared ray (NIR), but the invention is not limited thereto. The light source 160 is, for example, a light-emitting diode, though the invention is not limited thereto, and in other embodiments, the light source 160 can also be other suitable types of light-emitting device.

In the present exemplary embodiment, the image capturing apparatus 100 may further include a first reflecting device 170 and a second reflecting device 180. The first reflecting device 170 is disposed on the first surface 112 of the light guide device 110. The first reflecting device 170 is located between the transparent device 120 and the light guide device 110. The second reflecting device 180 is disposed on the second surface 114 of the light guide device 110. The light guide device 110 is located between the first reflecting device 170 and the second reflecting device 180. The light beam L reflected by the first reflecting device 170 and the second reflecting device 180 is transmitted toward the transparent device 120, and is totally reflected by the interface (i.e. the surface 122) between the transparent device 120 and the environment medium 1. For example, in the present embodiment, the first reflecting device 170 and the second reflecting device 180 can be reflectors or reflecting layers formed by a coating method, which is not limited by the invention. In the present exemplary embodiment, the first reflecting device 170 may be surrounded by the first optical adhesive 130, and the first optical adhesive 130 has a high refractive index. In the present exemplary embodiment, the second reflecting device 180 may be surrounded by the second optical adhesive 150, and the second optical adhesive 150 has a high refractive index.

In the present exemplary embodiment, the display device 300 emits a visible light beam, and the visible light beam is able to pass through the first reflecting device 170 and the second reflecting device 180. In other words, an image light beam (i.e. the visible light beam) is not blocked by the first reflecting device 170 and the second reflecting device 180, and the display device 300 can provide an image having a good quality. For example, in the present exemplary embodiment, each of the first reflecting device 170 and the second reflecting device 180 may be multi-layers or metal tungsten oxide, but the invention is not limited thereto.

In the present embodiment, the light beam L is transmitted toward the first surface 112 of the light guide device 110 before being transmitted to the first reflecting device 170 and the second reflecting device 180, and the light beam L can be sequentially reflected by the first reflecting device 170 and the second reflecting device 180, and transmitted to the transparent device 120. However, the invention is not limited thereto, and in other embodiments, the light beam L can also be transmitted along other paths. Moreover, in the present embodiment, the first reflecting device 170 and the second reflecting device 180 can be staggered and partially overlapped. However, the invention is not limited thereto, and in other embodiments, the first reflecting device 170 and the second reflecting device 180 can be completely staggered without being overlapped, or can be configured in other suitable relative positions, which are described with reference of FIG. 2 and FIG. 3.

Figure 2:
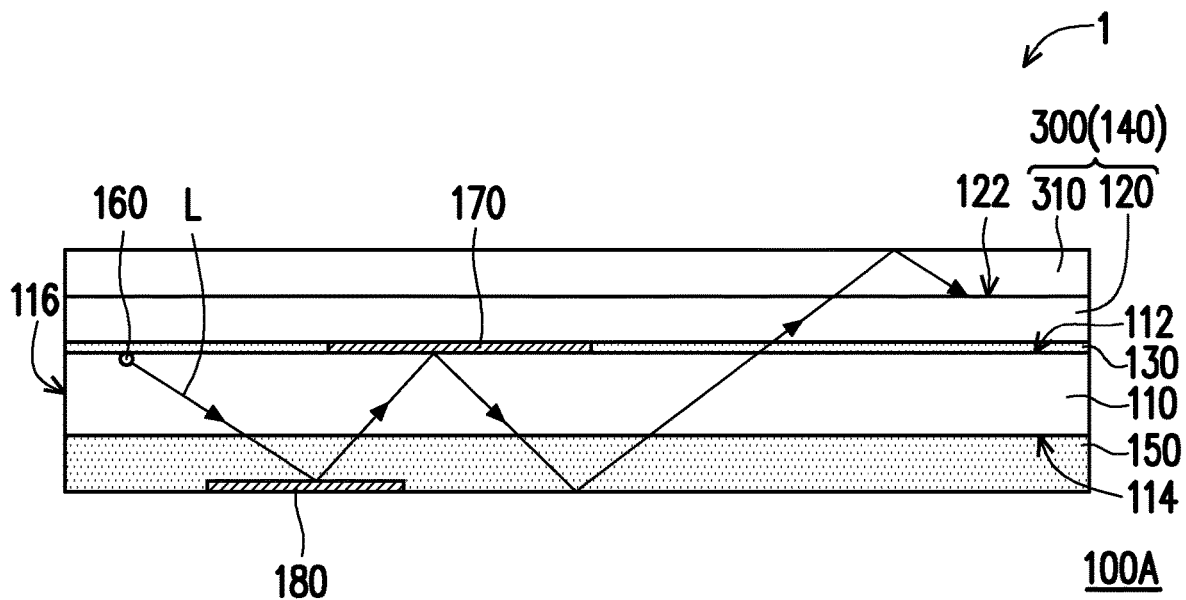
FIG. 2 is a cross-sectional view of an image capturing apparatus according to another embodiment of the invention.

FIG. 2 is a cross-sectional view of an image capturing apparatus according to another exemplary embodiment of the invention. The image capturing apparatus 100A of FIG. 2 is similar to the image capturing apparatus 100 of FIG. 1, so that the same or similar devices are denoted by the same or similar referential numbers. A difference between the image capturing apparatus 100A and the image capturing apparatus 100 is that in the embodiment of FIG. 2, the light beam L can be transmitted toward the second surface 114 of the light guide device 110 before being transmitted to the first reflecting device 170 and the second reflecting device 180, and the light beam L can be sequentially reflected by the second reflecting device 180 and the first reflecting device 170, and transmitted to the transparent device 120. For example, in the present embodiment, the first reflecting device 170 and the second reflecting device 180 can be reflectors or reflecting layers formed by a coating method, which is not limited by the invention. Moreover, in other embodiments, a reflection function of the second reflecting device 180 can also be replaced by an interface between the second optical adhesive 150 and an external air layer, where a refractive index of the second optical adhesive 150 is different to a refractive index of the external air layer.

Moreover, another difference between the image capturing apparatus 100A and the image capturing apparatus 100 is that in the embodiment of FIG. 2, the display device 300 is disposed on the first surface 112 of the light guide device 110. The display device 300 includes a first substrate, a second substrate 310 and a display medium (not shown) disposed between the first substrate and a second substrate 310. In the present exemplary embodiment, the first substrate of the display device 300 may be the transparent device 120, though the invention is not limited thereto. In the present exemplary embodiment, the image capturing device 140 may be integrated in the display device 300.

Figure 3:
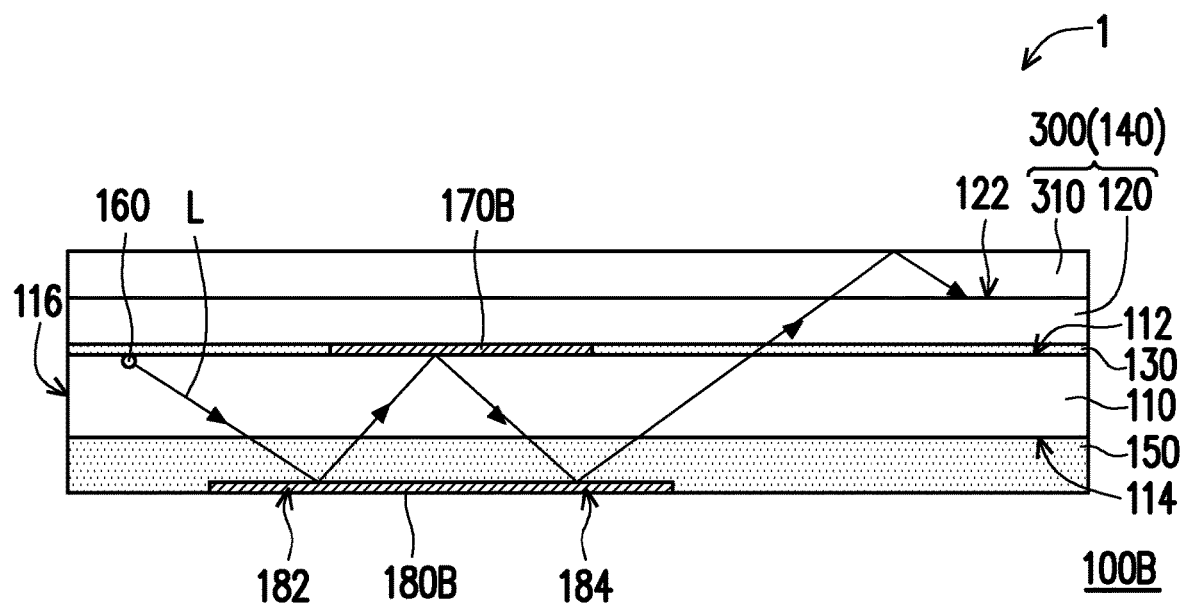
FIG. 3 is a cross-sectional view of an image capturing apparatus according to still another embodiment of the invention.

FIG. 3 is a cross-sectional view of an image capturing apparatus according to still another embodiment of the invention. The image capturing apparatus 100B of FIG. 3 is similar to the image capturing apparatus 100A of FIG. 2, so that the same or similar devices are denoted by the same or similar referential numbers. A difference between the image capturing apparatus 100B and the image capturing apparatus 100A is that in the embodiment of FIG. 3, the first reflecting device 170B and the second reflecting device 180B are not partially overlapped. In detail, the first reflecting device 170B can be located within an area of the second reflecting device 180B. In other words, an orthogonal projection of the first reflecting device 170B on the second surface 114 is completely located within an orthogonal projection of the second reflecting device 180B on the second surface 114. The light beam L can be sequentially reflected by a front end 182 of the second reflecting device 180B, the first reflecting device 170B and a back end 184 of the second reflecting device 180B, and transmitted to the transparent device 120.

Figure 4:
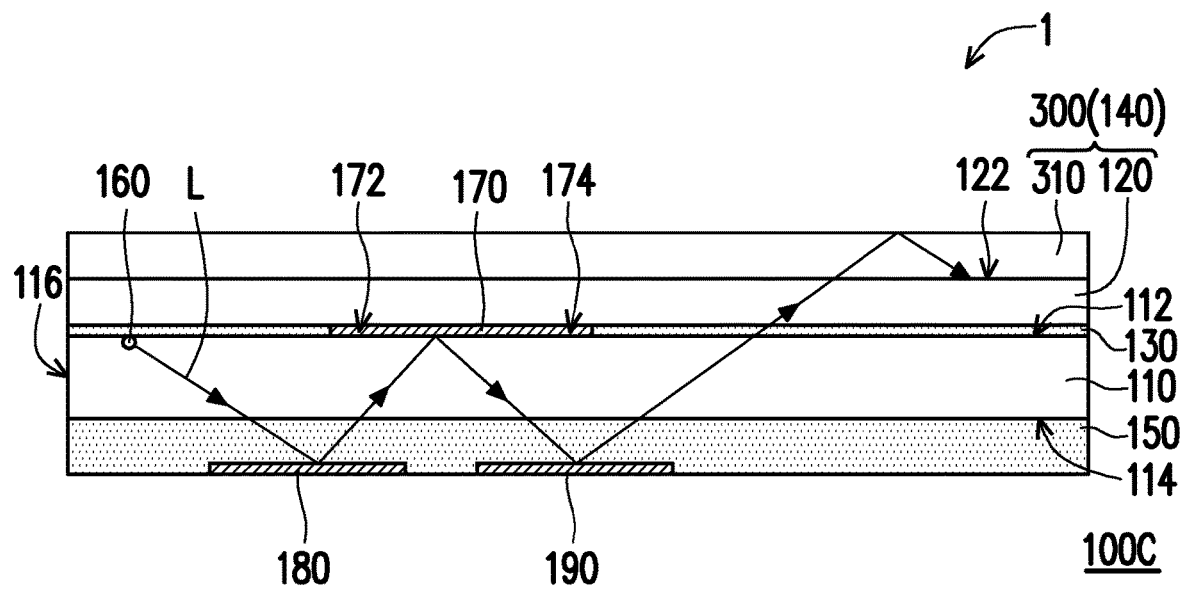
FIG. 4 is a cross-sectional view of an image capturing apparatus according to still another embodiment of the invention.

FIG. 4 is a cross-sectional view of an image capturing apparatus according to still another exemplary embodiment of the invention. The image capturing apparatus 100C of FIG. 4 is similar to the image capturing apparatus 100A of FIG. 2, so that the same or similar devices are denoted by the same or similar referential numbers. A difference between the image capturing apparatus 100C and the image capturing apparatus 100A is that the image capturing apparatus 100C of FIG. 4 further includes a third reflecting device 190. The third reflecting device 190 is disposed on the second surface 114 of the light guide device 110. The light beam L is sequentially reflected by the second reflecting device 180, the first reflecting device 170 and the third reflecting device 190, and transmitted to the transparent device 120. The second reflecting device 180 and the third reflecting device 190 can be separated. The second reflecting device 180 and the first reflecting device 170 are partially overlapped. In detail, the second reflecting device 180 is overlapped with a front end 172 of the first reflecting device 170 and is not overlapped with a back end 174 of the first reflecting device 170. The third reflecting device 190 and the first reflecting device 170 are partially overlapped. In detail, the third reflecting device 190 is overlapped with the back end 174 of the first reflecting device 170 and is not overlapped with the front end 172 of the first reflecting device 170. Moreover, the second reflecting device 180, the third reflecting device 190 or the image capturing device 140 shown in FIG. 4 are not necessarily disposed in the second optical adhesive 150. In other embodiments, the second reflecting device 180, the third reflecting device 190 or the image capturing device 140 may also be disposed on the second surface 114 of the light guide device 110. In other words, the second reflecting device 180, the third reflecting device 190 or the image capturing device 140 may also be disposed at another side of the second optical adhesive 150.

It should be noted that in any embodiments of FIG. 1 to FIG. 4, the light guide device 110 has the sidewall 116 connected between the first surface 112 and the second surface 114, and a light absorbing layer (not shown) can be configured on the sidewall 116.

Figure 5:
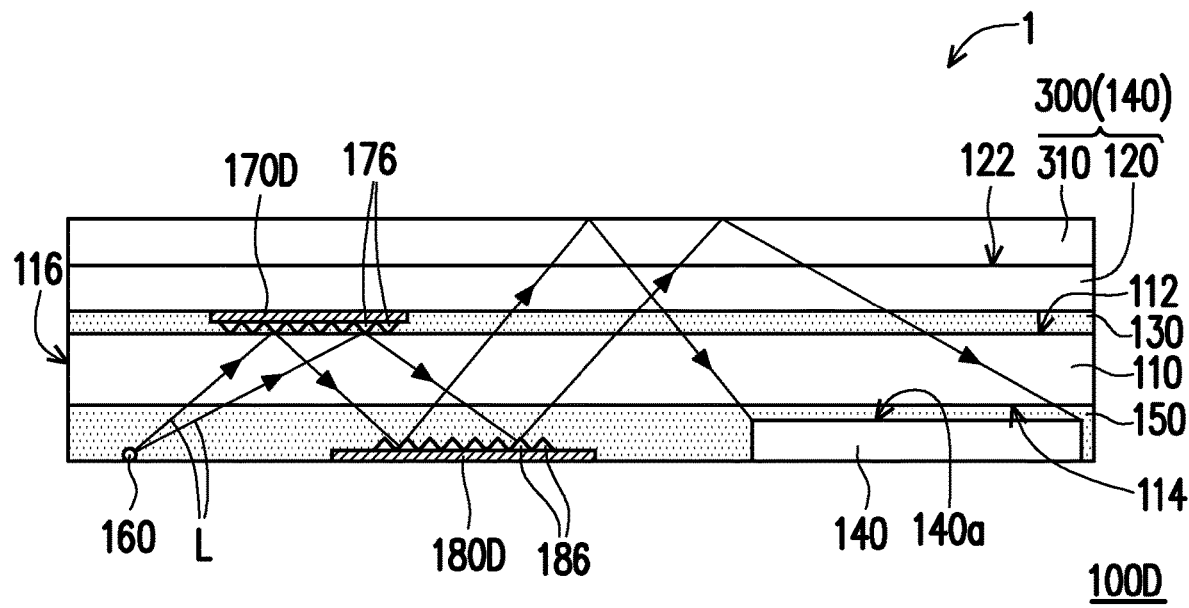
FIG. 5 is a cross-sectional view of an image capturing apparatus according to an embodiment of the invention.

FIG. 5 is a cross-sectional view of an image capturing apparatus according to an exemplary embodiment of the invention. The image capturing apparatus 100D of FIG. 5 is similar to the image capturing apparatus 100 of FIG. 1, so that the same or similar devices are denoted by the same or similar referential numbers. A difference between the image capturing apparatus 100D and the image capturing apparatus 100 is that in the embodiment of FIG. 5, at least one of the first reflecting device 170D and the second reflecting device 180D has one or a plurality of optical microstructures 176, 186. For example, both of the first reflecting device 170D and the second reflecting device 180D may selectively have one or a plurality of optical microstructures 176, 186. In an example of the present embodiment, the plurality of optical microstructures 176, 186 can be configured on the first reflecting device 170D and/or the second reflecting device 180D in a manner of continuous or interval configuration. In overall, the optical microstructures of the specification can be comprehensively or partially configured on any one of the reflecting devices. Moreover, the optical microstructures are not limited to be configured in continuous configuration or interval configuration. The light beam L can be reflected by one or a plurality of optical microstructures 176 of the first reflecting device 170D and/or one or a plurality of optical microstructures 186 of the second reflecting device 180D, and transmitted to the transparent device 120. In the present embodiment, the optical microstructures 176 can be comprehensively (or partially) configured on the first reflecting device 170D, and the optical microstructures 186 can be comprehensively (or partially) configured on the second reflecting device 180D. Moreover, a function of configuring the optical microstructures 176 and/or the second reflecting device 180D is to increase an image capturing area and make the light beam L transmitted to the image capturing device 140 to be more uniform, which avails an imaging effect.

Moreover, another difference between the image capturing apparatus 100D and the image capturing apparatus 100 is that in the embodiment of FIG. 5, the display device 300 is disposed above the light guide device 110. The display device 300 includes a first substrate, a second substrate 310 and a display medium (not shown) disposed between the first substrate and a second substrate 310. In the present exemplary embodiment, the first substrate of the display device 300 may be the transparent device 120, though the invention is not limited thereto. In the present exemplary embodiment, the image capturing device 140 may be separated from the display device 300.

Figure 6:
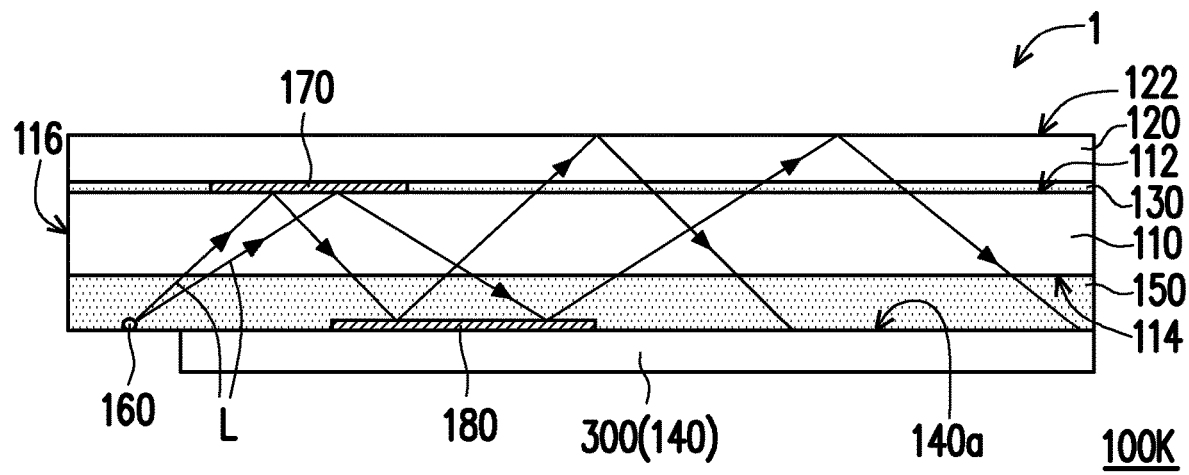
FIG. 6 is a cross-sectional view of an image capturing apparatus according to an exemplary embodiment of the invention.

FIG. 6 is a cross-sectional view of an image capturing apparatus according to an exemplary embodiment of the invention. The image capturing apparatus 100K of FIG. 6 is similar to the image capturing apparatus 100 of FIG. 1, so that the same or similar devices are denoted by the same or similar referential numbers. A difference between the image capturing apparatus 100K and the image capturing apparatus 100 is that in the embodiment of FIG. 6, the image capturing device 140 is integrated in the display device 300. In other words, the display device 300 has pixels arranged in a matrix, and the pixels includes first pixels used to display an image and second pixels used to detect light beam L.

Figure 7:
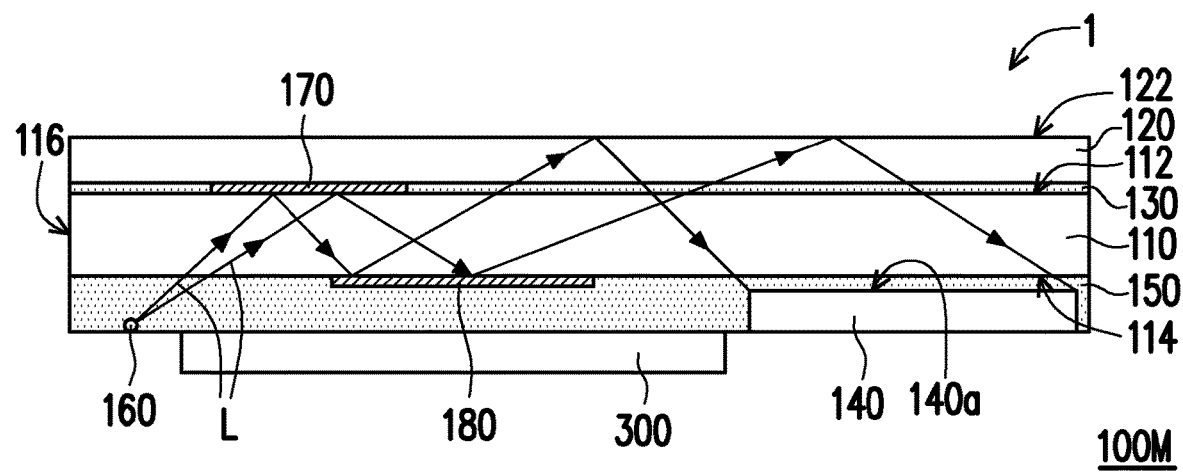
FIG. 7 is a cross-sectional view of an image capturing apparatus according to an exemplary embodiment of the invention.

FIG. 7 is a cross-sectional view of an image capturing apparatus according to an exemplary embodiment of the invention. The image capturing apparatus 100M of FIG. 7 is similar to the image capturing apparatus 100 of FIG. 1, so that the same or similar devices are denoted by the same or similar referential numbers. A difference between the image capturing apparatus 100M and the image capturing apparatus 100 is that in the embodiment of FIG. 7, the second reflecting element 180 is directly disposed on the second surface 114 of the light guide device 110.

Figure 8:
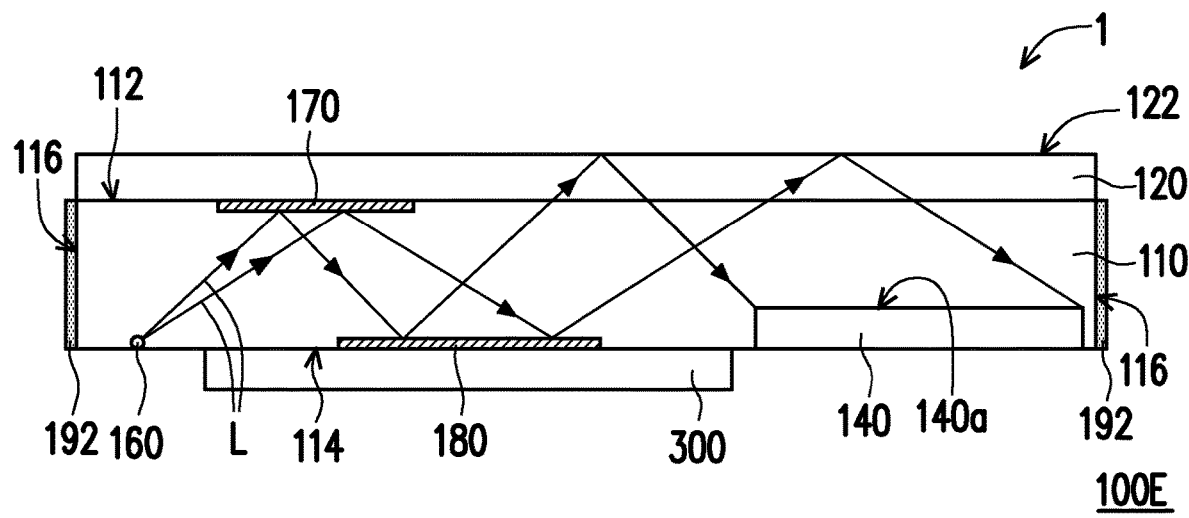
FIG. 8 is a cross-sectional view of an image capturing apparatus according to another embodiment of the invention.
Figure 9:
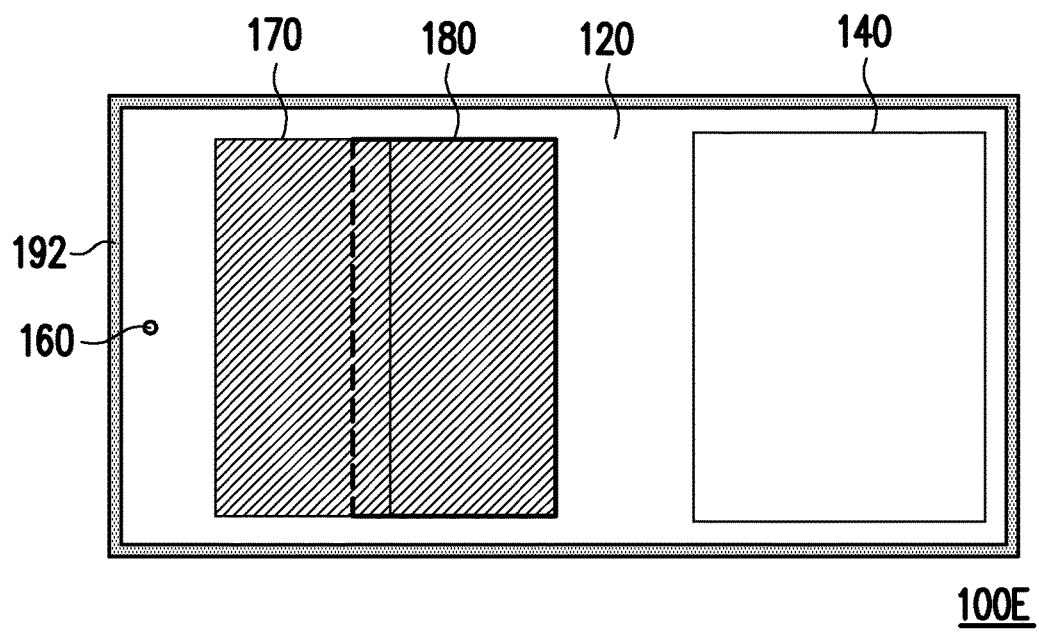
FIG. 9 is a top view of the image capturing apparatus of FIG. 8.

FIG. 8 is a cross-sectional view of an image capturing apparatus according to another exemplary embodiment of the invention. FIG. 9 is a top view of the image capturing apparatus of FIG. 8. The image capturing apparatus 100E of FIG. 8 and FIG. 9 is similar to the image capturing apparatus 100 of FIG. 1, so that the same or similar devices are denoted by the same or similar referential numbers. A difference between the image capturing apparatus 100E and the image capturing apparatus 100 is that the image capturing apparatus 100E further includes a light absorbing layer 192. The light absorbing layer 192 may absorb light. In other words, the light absorbing layer 192 can be an opaque and non-reflective light-shielding layer. The light absorbing layer 192 covers the sidewall 116 of the light guide device 110. The light absorbing layer 192 may absorb a stray light L incident to the sidewall 116 to improve the image capturing quality of the image capturing apparatus 100E. In the present embodiment, the light absorbing layer 192 can be an ink layer or an adhesive member, though the invention is not limited thereto, and in other embodiments, the light absorbing layer 192 can be other suitable light absorbing materials.

Figure 10:
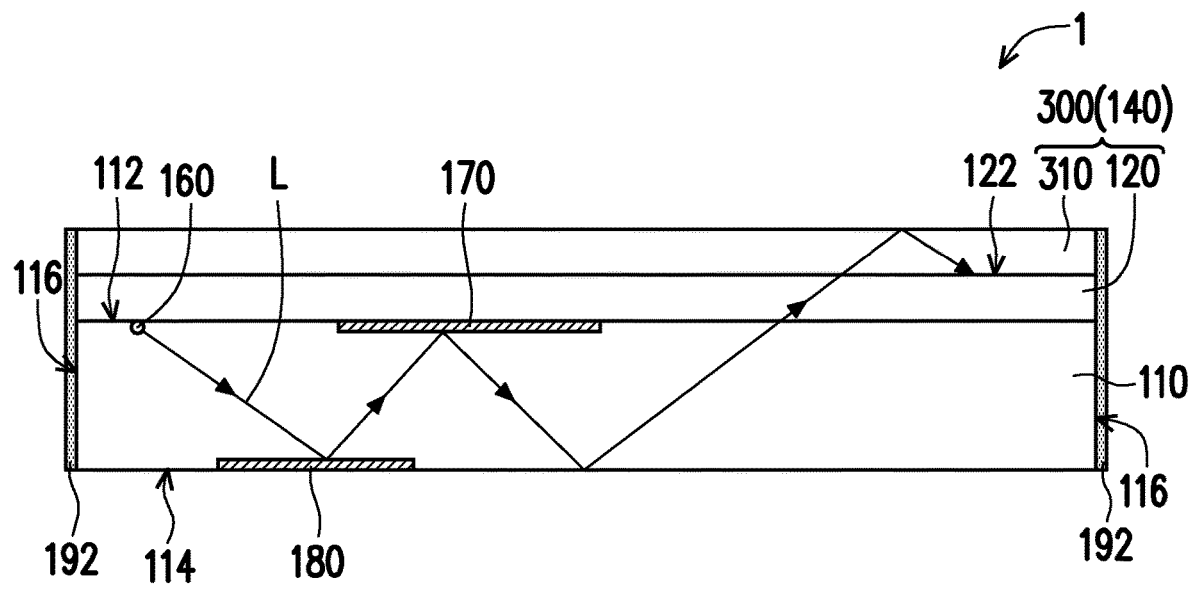
FIG. 10 is a cross-sectional view of an image capturing apparatus according to still another embodiment of the invention.
Figure 11:
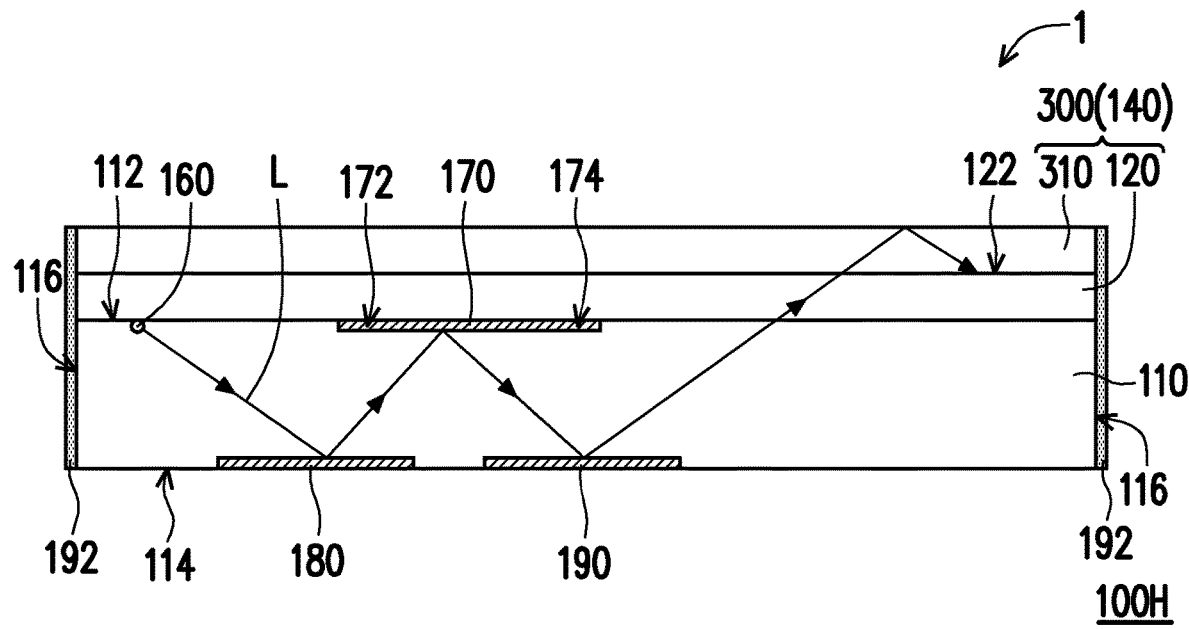
FIG. 11 is a cross-sectional view of an image capturing apparatus according to still another embodiment of the invention.
Figure 12:
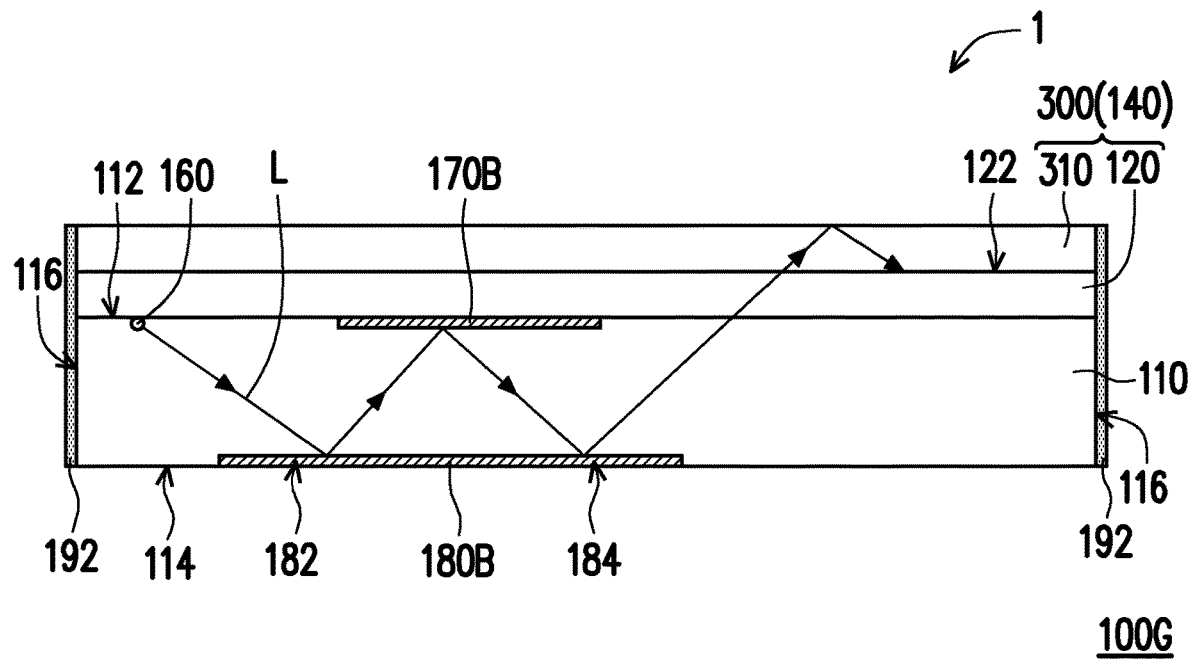
FIG. 12 is a cross-sectional view of an image capturing apparatus according to still another embodiment of the invention.
Figure 13:
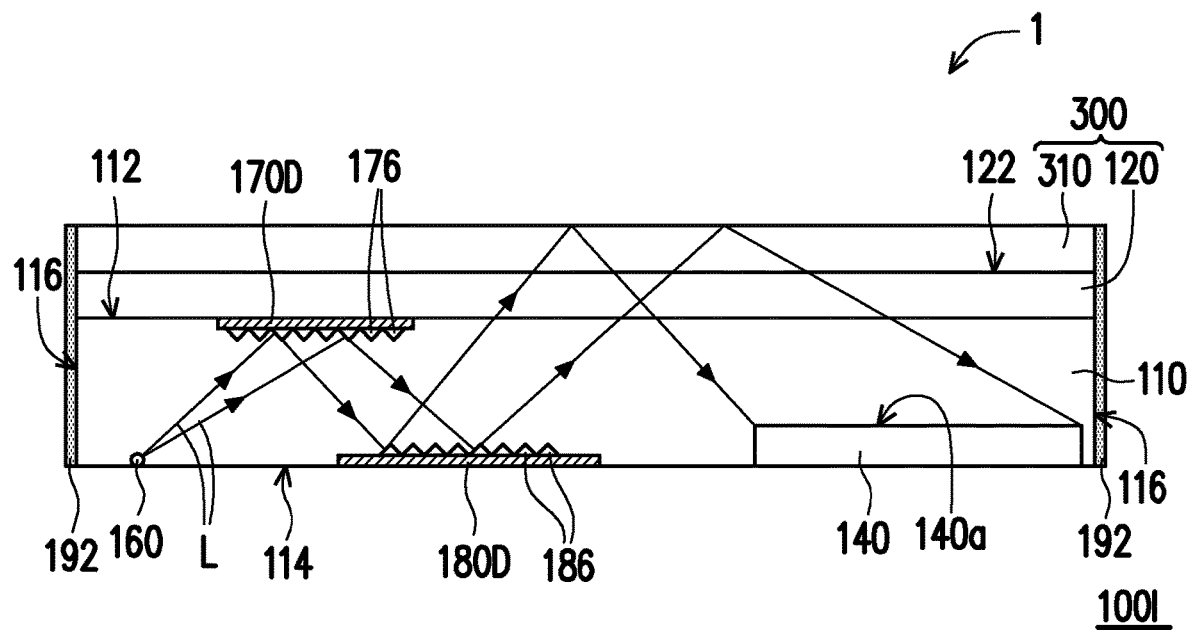
FIG. 13 is a cross-sectional view of an image capturing apparatus according to still another embodiment of the invention.

FIG. 10 is a cross-sectional view of an image capturing apparatus according to still another exemplary embodiment of the invention. FIG. 11 is a cross-sectional view of an image capturing apparatus according to still another embodiment of the invention. FIG. 12 is a cross-sectional view of an image capturing apparatus according to still another embodiment of the invention. FIG. 13 is a cross-sectional view of an image capturing apparatus according to still another exemplary embodiment of the invention. The image capturing apparatuses 100F, 100G, 100H, 100I of FIG. 10, FIG. 11, FIG. 12 and FIG. 13 are similar to the image capturing apparatuses 100A, 100C, 100B, 100D of FIG. 2, FIG. 4, FIG. 3 and FIG. 5, so that the same or similar devices are denoted by the same or similar referential numbers. A difference between the image capturing apparatuses 100F, 100G, 100H, 100I and the image capturing apparatuses 100A, 100B, 100C, 100D is that the image capturing apparatuses 100F, 100G, 100H, 100I are respectively added with a light absorbing layer 192 covering the sidewall 116 compared to the image capturing apparatuses 100A, 100B, 100C, 100D.

Figure 14:
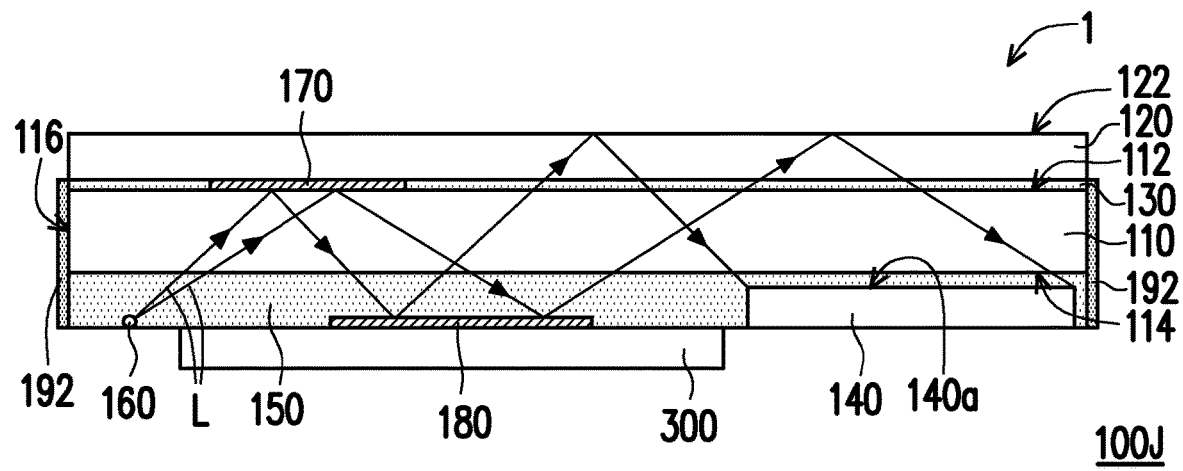
FIG. 14 is a cross-sectional view of an image capturing apparatus according to still another embodiment of the invention.
Figure 15:
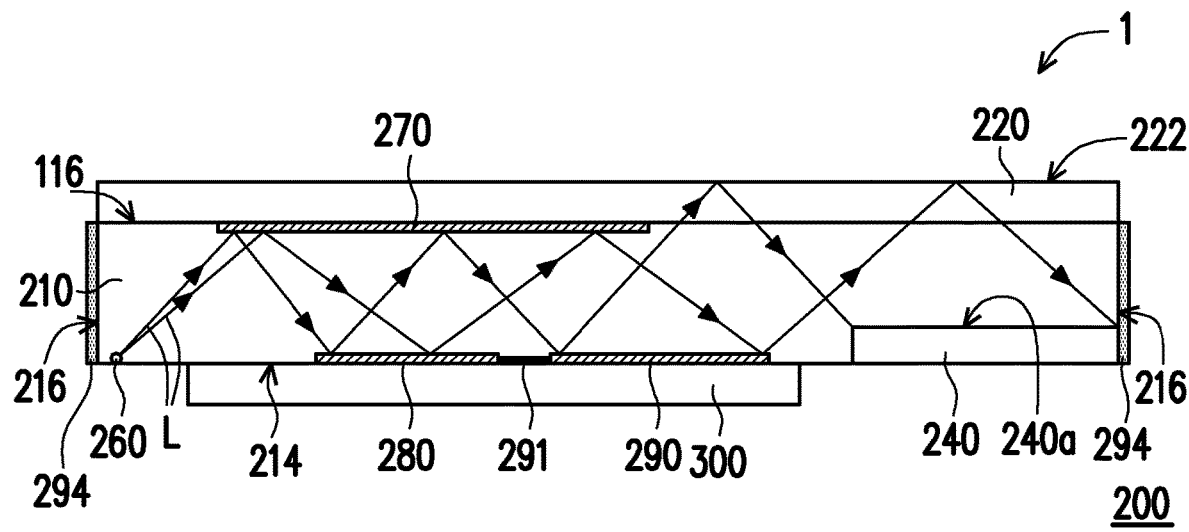
FIG. 15 is a cross-sectional view of an image capturing apparatus according to still another embodiment of the invention.

FIG. 14 is a cross-sectional view of an image capturing apparatus according to still another exemplary embodiment of the invention. The image capturing apparatus 100J of FIG. 14 is similar to the image capturing apparatus 100 of FIG. 1, so that the same or similar devices are denoted by the same or similar referential numbers. A difference between the image capturing apparatus 100J and the image capturing apparatus 100 is that the image capturing apparatus 100J is added with the light absorbing layer 192 compared to the image capturing apparatus 100. The light absorbing layer 192 at least covers the sidewall 116 of the light guide device 110. In the embodiment of FIG. 15, the light absorbing layer 192 may selectively cover the sidewall of the first optical adhesive 130 and/or the sidewall of the second optical adhesive 150, though the invention is not limited thereto.

FIG. 15 is a cross-sectional view of an image capturing apparatus according to still another exemplary embodiment of the invention. Referring to FIG. 15, the image capturing apparatus 200 is located in the environment medium 1. In the present embodiment, the environment medium 1 is, for example, air, though the invention is not limited thereto, and in other embodiments, the image capturing apparatus 200 can also be located in other types of environment medium. The image capturing apparatus 200 is used for capturing an image of an object. Under a normal situation, the object has a biometric feature of, for example, a fingerprint, a palmprint, veins, etc., though the invention is not limited thereto.

The image capturing apparatus 200 includes a light guide device 210. The light guide device 210 has a first surface 212 and a second surface 214 disposed opposite to each other. The image capturing apparatus 200 further includes a transparent device 220. The transparent device 220 is disposed on the first surface 212 of the light guide device 210. The transparent device 220 has a surface 222 back-facing to the light guide device 210. In the present embodiment, if the image capturing apparatus 200 is used for capturing a fingerprint and/or finger veins, the surface 222 of the transparent device 220 faces to a finger, though the invention is not limited thereto.

The image capturing apparatus 200 includes a first reflecting device 270 and a second reflecting device 280. The first reflecting device 270 is disposed on the first surface 212 of the light guide device 210. The first reflecting device 270 is located between the transparent device 220 and the light guide device 210. The second reflecting device 280 is disposed on the second surface 214 of the light guide device 210. The light guide device 210 is located between the first reflecting device 270 and the second reflecting device 280. In the present embodiment, the second reflecting device 280 can be located within an area of the first reflecting device 270, though the invention is not limited thereto. The image capturing apparatus 200 includes a light source 260. The light source 260 is adapted to emit a light beam L. The light beam L reflected by the first reflecting device 270 and the second reflecting device 280 is transmitted toward the transparent device 220, and is totally reflected by the interface (for example, the surface 222) between the the image capturing apparatus 200 and the environment medium 1. The image capturing apparatus 200 includes an image capturing device 240. The image capturing device 240 is disposed on the second surface 214 of the light guide device 210. The light guide device 210 is located between the transparent device 220 and the image capturing device 240. The image capturing device 240 has a light receiving surface 240a.

The image capturing apparatus 200 includes a display device 300. The display device 300 is disposed on the second surface 114 of the light guide device 110. In other words, the display device 300 is disposed under the light guide device 110. In the present embodiment, the display device 300 may cover the light guide device 110 partially, though the invention is not limited thereto. In other embodiments, the display device 300 may cover the light guide device 110 completely. In the present embodiment, the display device 300 may be a liquid crystal display (LCD), an OLED display or other type of a display. Moreover, in the present embodiment, the display device 300 may have a touch sensing layer, and the display device 300 may be a touch display device.

In the present exemplary embodiment, the display device 300 emits a visible light beam (not shown), and the visible light beam is able to pass through the first reflecting device 270, the second reflecting device 280 and the third reflecting device 290. In other words, an image light beam (i.e. the visible light beam) is not blocked by the first reflecting device 270, the second reflecting device 280 and the third reflecting device 290, and the display device 300 can provide an image having a good quality.

In the present exemplary embodiment, each of the first reflecting device 270, the second reflecting device 280 and the third reflecting device 290 has a low refractive index. For example, materials of the first reflecting device 270, the second reflecting device 280 and the third reflecting device 290 may be $MgF_2$, though the invention is not limited thereto.

It should be noted that the image capturing apparatus 200 includes a first light absorbing device 291. The first light absorbing device 291 is disposed on the second surface 214 of the light guide device 210. The first light absorbing device 291 may absorb the stray light L transmitted to the second surface 214, so as to improve the image capturing quality of the image capturing apparatus 200. In the present embodiment, the first light absorbing device 291 can be disposed beside the second reflecting device 280 without overlapping with the second reflecting device 280. Further, the image capturing apparatus 200 further includes a third reflecting device 290. The third reflecting device 290 is disposed on the second surface 214 of the light guide device 210. The first light absorbing device 291 can be located between the second reflecting device 280 and the third reflecting device 290. The light beam L reflected by the first reflecting device 270, the second reflecting device 280 and the third reflecting device 290 is transmitted toward the transparent device 220.

Figure 16:
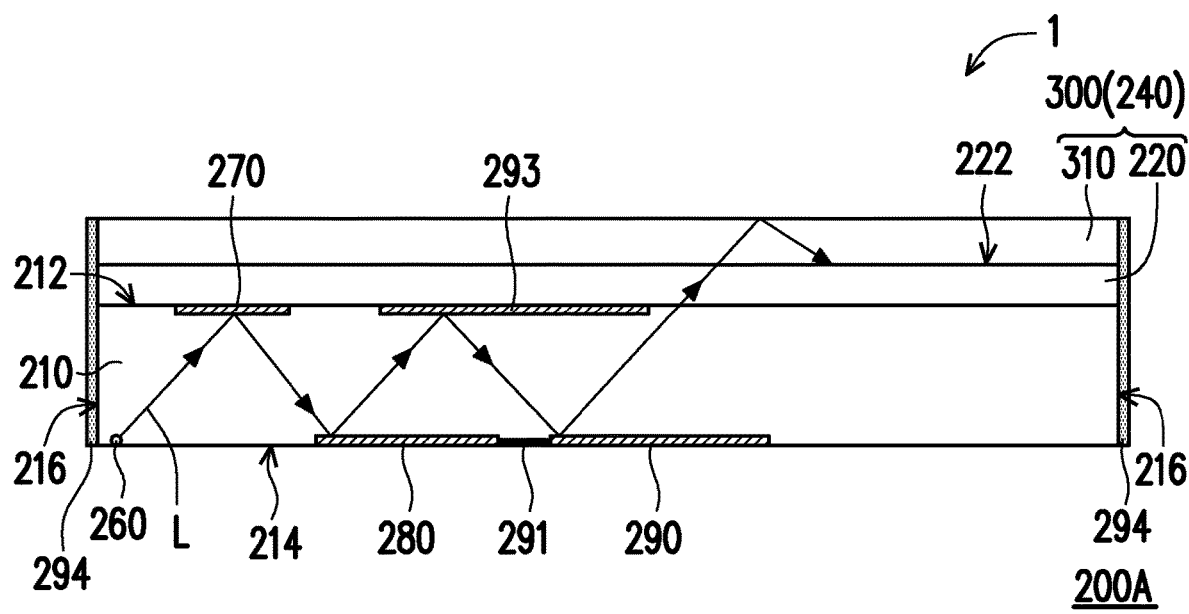
FIG. 16 is a cross-sectional view of an image capturing apparatus according to an embodiment of the invention.

FIG. 16 is a cross-sectional view of an image capturing apparatus according to an embodiment of the invention. The image capturing apparatus 200A of FIG. 16 is similar to the image capturing apparatus 200 of FIG. 15, so that the same or similar devices are denoted by the same or similar referential numbers. A difference between the image capturing apparatus 200A and the image capturing apparatus 200 is that the image capturing apparatus 200A further includes a fourth reflecting device 293. The fourth reflecting device 293 is disposed on the first surface 212 of the light guide device 210 and is separated from the first reflecting device 270. The light beam L reflected by the first reflecting device 270, the second reflecting device 280, the third reflecting device 290 and the fourth reflecting device 293 is transmitted toward the transparent device 220. In the present embodiment, the light beam L can be sequentially reflected by the first reflecting device 270, the second reflecting device 280, the fourth reflecting device 293 and the third reflecting device 290, and is transmitted toward the transparent device 220.

Moreover, another difference between the image capturing apparatus 200A and the image capturing apparatus 200 is that in the embodiment of FIG. 16, the display device 300 is disposed above the light guide device 110. The display device 300 includes a first substrate, a second substrate 310 and a display medium (not shown) disposed between the first substrate and a second substrate 310. In the present exemplary embodiment, the first substrate of the display device 300 may be the transparent device 220, though the invention is not limited thereto. In the present exemplary embodiment, the image capturing device 240 may be integrated in the display device 300.

Figure 17:
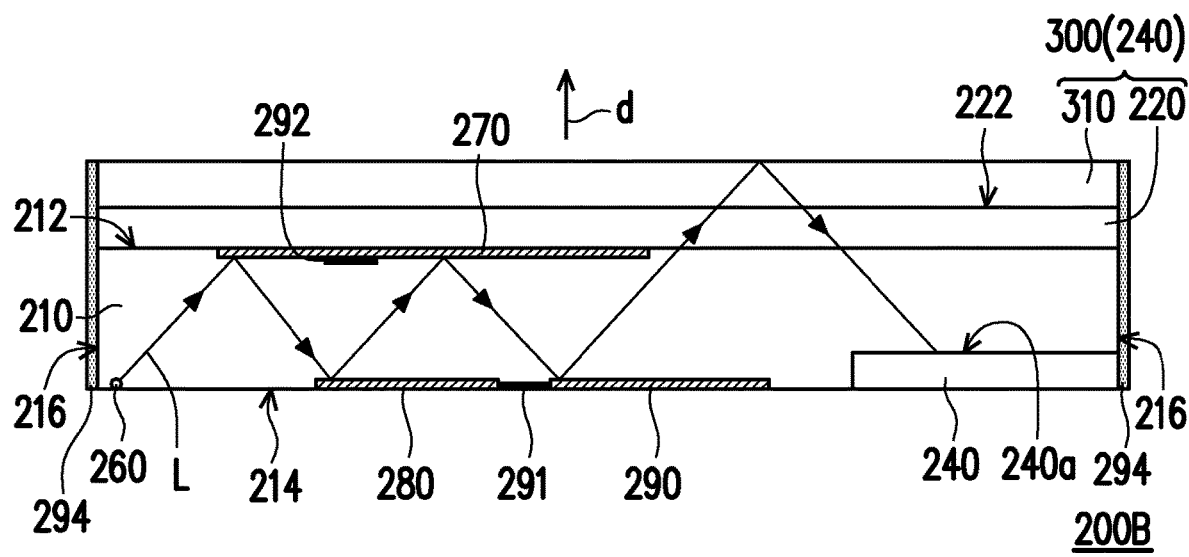
FIG. 17 is a cross-sectional view of an image capturing apparatus according to another embodiment of the invention.

FIG. 17 is a cross-sectional view of an image capturing apparatus according to another exemplary embodiment of the invention. The image capturing apparatus 200B of FIG. 17 is similar to the image capturing apparatus 200 of FIG. 15, so that the same or similar devices are denoted by the same or similar referential numbers. A difference between the image capturing apparatus 200B and the image capturing apparatus 200 is that the image capturing apparatus 200B further includes a second light absorbing device 292. The second light absorbing device 292 is disposed on the first surface 212 of the light guide device 210. The second light absorbing device 292 may absorb the stray light L transmitted to the first surface 212, so as to improve the image capturing quality of the image capturing apparatus 200B. In the present embodiment, the second light absorbing device 292 can be selectively disposed on the first reflecting device 280 and located between the first reflecting device 270 and the second surface 214 of the light guide device 210. The first light absorbing device 291 and the second light absorbing device 292 can be staggered, and are not overlapped along a direction d perpendicular to the surface 222.

Moreover, another difference between the image capturing apparatus 200B and the image capturing apparatus 200 is that in the embodiment of FIG. 17, the display device 300 is disposed above the light guide device 110. The display device 300 includes a first substrate, a second substrate 310 and a display medium (not shown) disposed between the first substrate and a second substrate 310. In the present exemplary embodiment, the first substrate of the display device 300 may be the transparent device 220, though the invention is not limited thereto. In the present exemplary embodiment, the image capturing device 240 may be separated from the display device 300.

Figure 18:
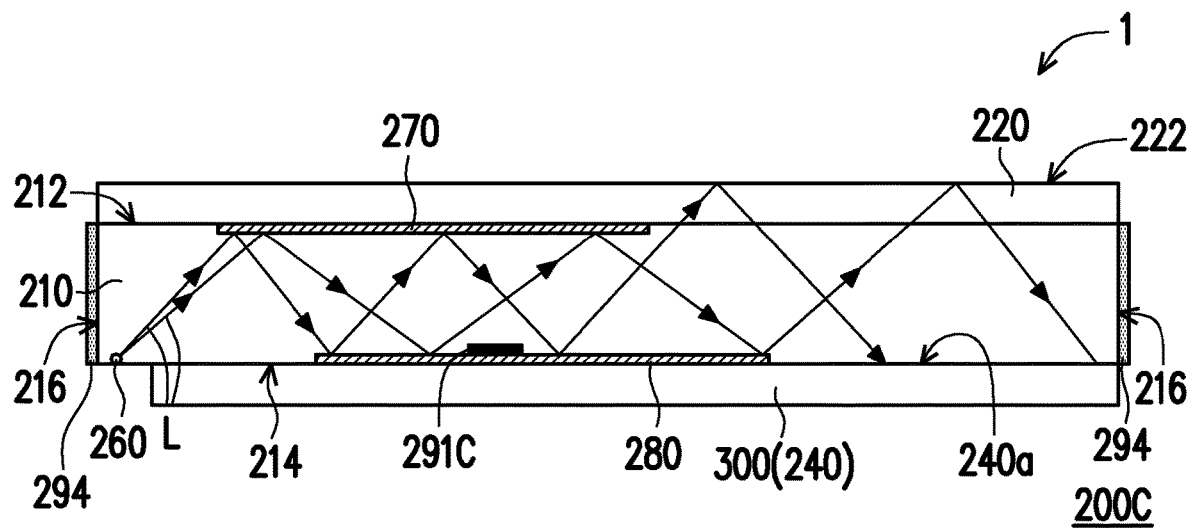
FIG. 18 is a cross-sectional view of an image capturing apparatus according to still another embodiment of the invention.

FIG. 18 is a cross-sectional view of an image capturing apparatus according to still another exemplary embodiment of the invention. The image capturing apparatus 200C of FIG. 18 is similar to the image capturing apparatus 200 of FIG. 15, so that the same or similar devices are denoted by the same or similar referential numbers. A difference between the image capturing apparatus 200C and the image capturing apparatus 200 is that the first light absorbing device 291C of the image capturing apparatus 200C is disposed on the second reflecting device 280 and is located between the first surface 212 of the light guide device 210 and the second reflecting device 280.

Moreover, another difference between the image capturing apparatus 200C and the image capturing apparatus 200 is that in the embodiment of FIG. 18, the image capturing device 240 may be integrated in the display device 300.

Figure 19:
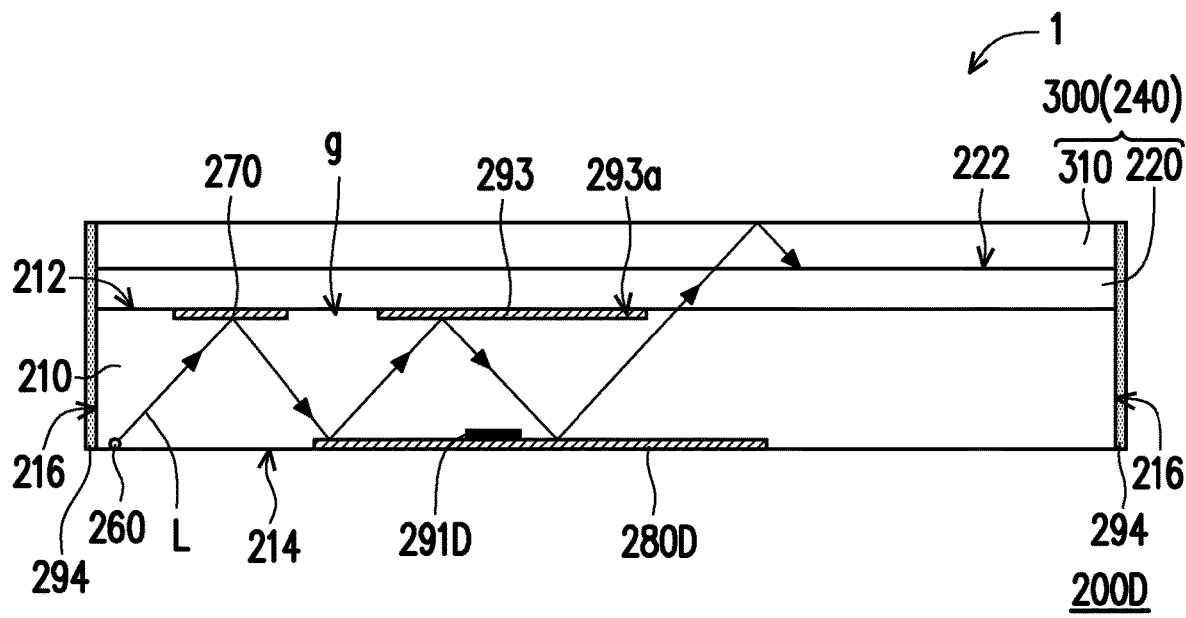
FIG. 19 is a cross-sectional view of an image capturing apparatus according to still another embodiment of the invention.

FIG. 19 is a cross-sectional view of an image capturing apparatus according to still another exemplary embodiment of the invention. The image capturing apparatus 200D of FIG. 19 is similar to the image capturing apparatus 200A of FIG. 16, so that the same or similar devices are denoted by the same or similar referential numbers. A difference between the image capturing apparatus 200D and the image capturing apparatus 200A is that the image capturing apparatus 200D does not include the third reflecting device 290 of the image capturing apparatus 200A, the second reflecting device 280D of the image capturing apparatus 200D at least extends from a position right below a gap g between the first reflecting device 270 and the fourth reflecting device 293 to a position right below a tail end 293a of the fourth reflecting device 293, and the first light absorbing device 291D can be disposed on the second reflecting device 280D and is located between the second surface 214 of the light guide device 210 and the second reflecting device 280D.

It should be noted that in another variation of FIG. 15 to FIG. 19, the light guide devices 210 have the first surface 212 and the second surface 214 opposite to each other and the sidewall 216 connected between the first surface 212 and the second surface 214, and the sidewall 216 can also be covered with a light absorbing layer 294. Moreover, the light guide device 210 of any of FIG. 15 to FIG. 19 can be a transparent plate or an optical adhesive filled in a location of the light guide device 210 (a multi-layer light guide medium shown in FIG. 1 can be used) in the space occupied by the light guide device 210, which is not limited by the invention.

The first light absorbing devices 291 of FIG. 15 to FIG. 17, the first light absorbing device 291C of FIG. 18, the first light absorbing device 291D of FIG. 19 and the second light absorbing device 292 of FIG. 17 are used to absorb the light beam L emitted by the light source 160. The first light absorbing devices 291 of FIG. 15 to FIG. 17, the first light absorbing device 291C of FIG. 18, the first light absorbing device 291D of FIG. 19 and the second light absorbing device 292 of FIG. 17 are not used to absorb the visible light beam provided by the display device 300.

Figure 20:
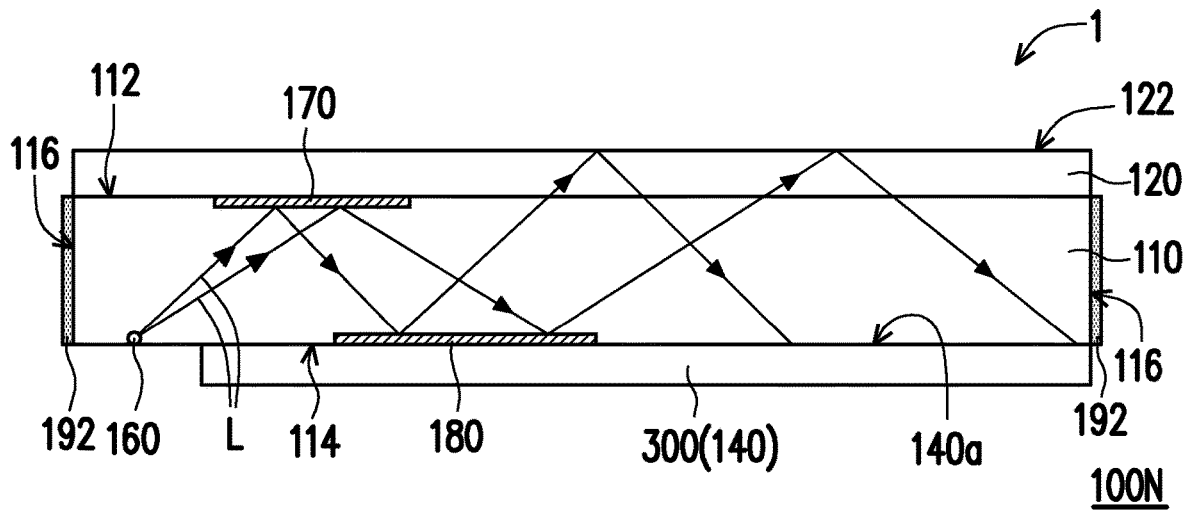
FIG. 20 is a cross-sectional view of an image capturing apparatus according to an exemplary embodiment of the invention.

FIG. 20 is a cross-sectional view of an image capturing apparatus according to an exemplary embodiment of the invention. The image capturing apparatus 100N of FIG. 20 is similar to the image capturing apparatus 100E of FIG. 8, so that the same or similar devices are denoted by the same or similar referential numbers. A difference between the image capturing apparatus 100N and the image capturing apparatus 100E is that in the embodiment of FIG. 20 the image capturing device 140 is integrated in the display device 300.

In summary, in the image capturing apparatus of an embodiment of the invention, the light guide device with a low material cost can be inserted between the transparent device and the image capturing device to replace a part of the optical adhesives originally required to be filled between the transparent device and the image capturing device in a large amount. In this way, the usage amount of the optical adhesive with a high material cost can be decreased to decrease the cost of the image capturing apparatus.

In the image capturing apparatus of another embodiment of the invention, the sidewall of the light guide device is covered with the light absorbing layer, and the light absorbing layer is adapted to absorb a stray light beam incident to the sidewall, so as to improve the image capturing quality of the image capturing apparatus.

In the image capturing apparatus of still another embodiment of the invention, the light guide device has the first surface facing to the transparent device and the second surface opposite to the first surface. The first surface of the light guide device is configured with the first reflecting device. The second surface of the light guide device is configured with the second reflecting device. The second surface of the light guide device is configured with the first light absorbing device. The first light absorbing device is adapted to absorb the stray light beam transmitted to the second surface, so as to improve the image capturing quality of the image capturing apparatus.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An image capturing apparatus, located in an environment medium, the image capturing apparatus comprising:
    a light guide device, having a first surface and a second surface disposed opposite to each other;
    an image capturing device, disposed above or under the light guide device;
    a display device, disposed above or under the light guide device;
    a first optical adhesive, disposed on the first surface of the light guide device;
    a second optical adhesive, disposed on the second surface of the light guide device, wherein a material of the light guide device is different to a material of the first optical adhesive and/or a material of the second optical adhesive; and
    a light source, adapted to emit a light beam, wherein the light beam passed through the light guide device is totally reflected by an interface between the image capturing apparatus and the environment medium.

2. The image capturing apparatus as claimed in claim 1, wherein the light guide device is a glass.

3. The image capturing apparatus as claimed in claim 1, wherein a refractive index of the light guide device is greater than or equal to 1.4 and is smaller than or equal to 1.6.

4. The image capturing apparatus as claimed in claim 1, further comprising:
    a first reflecting device, disposed on the first surface of the light guide device; and
    a second reflecting device, disposed on the second surface of the light guide device, wherein the light beam reflected by the first reflecting device and the second reflecting device is transmitted toward the interface.

5. The image capturing apparatus as claimed in claim 4, wherein the display device emits a visible light beam, and the visible light beam is able to pass through the first reflecting device.

6. The image capturing apparatus as claimed in claim 4, wherein the display device emits a visible light beam, and the visible light beam is able to pass through the second reflecting device.

7. The image capturing apparatus as claimed in claim 1, wherein the light guide device further has a sidewall connected between the first surface and the second surface, and the sidewall is covered with a light absorbing layer.

8. The image capturing apparatus as claimed in claim 1, wherein at least one of a refractive index of the first optical adhesive and a refractive index of the second optical adhesive is greater than or equal to 1.4 and is smaller than or equal to 1.6.

9. The image capturing apparatus as claimed in claim 1, wherein the image capturing device is integrated in the display device.

10. An image capturing apparatus, located in an environment medium, the image capturing apparatus comprising:
    a light guide device, having a first surface and a second surface disposed opposite to each other and a sidewall connected between the first surface and the second surface;
    an image capturing device, disposed above or under the light guide device;
    a display device, disposed above or under the light guide device;
    a light absorbing layer, covering the sidewall of the light guide device; and
    a light source, adapted to emit a light beam, wherein the light beam passed through the light guide device is totally reflected by an interface between the image capturing apparatus and the environment medium.

11. The image capturing apparatus as claimed in claim 10, further comprising:
    a first reflecting device, disposed on the first surface of the light guide device; and
    a second reflecting device, disposed on the second surface of the light guide device, wherein the light beam reflected by the first reflecting device and the second reflecting device is transmitted toward the interface.

12. The image capturing apparatus as claimed in claim 11, wherein the display device emits a visible light beam, and the visible light beam is able to pass through the first reflecting device.

13. The image capturing apparatus as claimed in claim 11, wherein the display device emits a visible light beam, and the visible light beam is able to pass through the second reflecting device.

14. The image capturing apparatus as claimed in claim 10, wherein the image capturing device is integrated in the display device.

15. An image capturing apparatus located in an environment medium, the image capturing apparatus comprising:
    a light guide device, having a first surface and a second surface disposed opposite to each other;
    a first reflecting device, disposed on the first surface of the light guide device;
    a second reflecting device, disposed on the second surface of the light guide device;
    an image capturing device, disposed above or under the light guide device;
    a display device, disposed above or under the light guide device;
    a first light absorbing device, disposed on the second surface of the light guide device; and
    a light source, adapted to emit a light beam, wherein the light beam reflected by the first reflecting device and the second reflecting device is totally reflected by an interface between the image capturing apparatus and the environment medium.

16. The image capturing apparatus as claimed in claim 15, wherein the first light absorbing device is disposed on the second reflecting device and is located between the first surface of the light guide device and the second reflecting device.

17. The image capturing apparatus as claimed in claim 15, wherein the first light absorbing device is disposed beside the second reflecting device and is not overlapped with the second reflecting device.

18. The image capturing apparatus as claimed in claim 15, further comprising:
    a third reflecting device, disposed on the second surface of the light guide device, wherein the first light absorbing device is located between the second reflecting device and the third reflecting device, and the light beam reflected by the first reflecting device, the second reflecting device and the third reflecting device is transmitted toward the interface.

19. The image capturing apparatus as claimed in claim 15, further comprising:
    a second light absorbing device, disposed on the first surface of the light guide device.

20. The image capturing apparatus as claimed in claim 15, wherein the first reflecting device and the second reflecting device are partially overlapped.

21. The image capturing apparatus as claimed in claim 15, wherein one of the first reflecting device and the second reflecting device is located within an area of the other one of the first reflecting device and the second reflecting device.

22. The image capturing apparatus as claimed in claim 15, wherein the light guide device has a first surface and a second surface opposite to each other and a sidewall connected between the first surface and the second surface, and the sidewall is covered with a light absorbing layer.

23. The image capturing apparatus as claimed in claim 15, wherein the display device emits a visible light beam, and the visible light beam is able to pass through the first reflecting device.

24. The image capturing apparatus as claimed in claim 15, wherein the display device emits a visible light beam, and the visible light beam is able to pass through the second reflecting device.

25. The image capturing apparatus as claimed in claim 15, wherein the image capturing device is integrated in the display device.

* * * * *